(12) United States Patent
Jaegle et al.

(10) Patent No.: US 10,240,517 B2
(45) Date of Patent: Mar. 26, 2019

(54) TURBOCHARGER COMPRISING A REGULATING UNIT

(71) Applicant: CONTINENTAL AUTOMOTIVE GMBH, Hannover (DE)

(72) Inventors: Alexander Jaegle, Mannheim (DE); Bruno Ferling, Beindersheim (DE); Alexander Fietsch, Worms (DE); Mark Paulov, Dannstadt-Schauernheim (DE)

(73) Assignee: Continental Automotive GmbH, Hannover (DE)

( * ) Notice: Subject to any disclaimer, the term of this patent is extended or adjusted under 35 U.S.C. 154(b) by 639 days.

(21) Appl. No.: 14/767,158

(22) PCT Filed: Jan. 15, 2014

(86) PCT No.: PCT/EP2014/050661
§ 371 (c)(1),
(2) Date: Aug. 11, 2015

(87) PCT Pub. No.: WO2014/121984
PCT Pub. Date: Aug. 14, 2014

(65) Prior Publication Data
US 2016/0003135 A1    Jan. 7, 2016

(30) Foreign Application Priority Data

Feb. 11, 2013 (DE) .......... 10 2013 202 191

(51) Int. Cl.
*F02B 37/18* (2006.01)
*F16B 7/18* (2006.01)
*F16B 37/06* (2006.01)

(52) U.S. Cl.
CPC ............ *F02B 37/186* (2013.01); *F16B 7/182* (2013.01); *F16B 37/061* (2013.01); *Y02T 10/144* (2013.01)

(58) Field of Classification Search
CPC ................. F02B 37/186; F16B 7/182
(Continued)

(56) References Cited

U.S. PATENT DOCUMENTS 3,153,988 A * 10/1964 Warstler .................. F15B 15/04
                                                                          92/119
5,159,815 A * 11/1992 Schlamadinger ..... F02B 37/186
                                                                          123/383

(Continued)

FOREIGN PATENT DOCUMENTS

CN    201916045 U    8/2011
CN    102392732 A    3/2012
(Continued)

OTHER PUBLICATIONS

JP 2009114928 A English Translation.*

*Primary Examiner* — Thai Ba Trieu
*Assistant Examiner* — Jessica Kebea
(74) *Attorney, Agent, or Firm* — Laurence A. Greenberg; Werner H. Stemer; Ralph E. Locher

(57) ABSTRACT

A turbocharger has a regulating unit for controlling the output of the turbocharger. The regulating unit can be adjusted by an actuator. The actuator is connected to the regulating unit by way of an actuating member and a lever. The actuating member and the lever are interconnected by way of a screw-nut element.

9 Claims, 3 Drawing Sheets

(58) Field of Classification Search
USPC .......................................................... 74/39.89
See application file for complete search history.

(56) References Cited

U.S. PATENT DOCUMENTS

| | | | |
|---|---|---|---|
| 6,233,807 B1 | 5/2001 | Werner | |
| 9,822,695 B2 * | 11/2017 | Kraemer | ................ F02B 37/186 |
| 2004/0149951 A1 * | 8/2004 | Gethmann | .............. F16K 31/44 |
| | | | 251/291 |
| 2007/0209363 A1 | 9/2007 | McEwen et al. | |
| 2010/0071435 A1 * | 3/2010 | Hatano | ................ B21D 39/037 |
| | | | 72/362 |
| 2010/0089055 A1 | 4/2010 | Severin | |
| 2010/0231070 A1 | 9/2010 | Hatano et al. | |
| 2015/0247448 A1 * | 9/2015 | Micanek | ................ F02B 37/186 |
| | | | 417/405 |
| 2016/0053675 A1 * | 2/2016 | Mehne | .................. F02B 37/186 |
| | | | 251/279 |

FOREIGN PATENT DOCUMENTS

| | | | | |
|---|---|---|---|---|
| DE | 19545610 A1 | 6/1997 | | |
| DE | 202012005834 U1 * | 7/2012 | ............ | F02B 37/186 |
| DE | 102011007072 A1 | 10/2012 | | |
| EP | 0260804 A2 * | 3/1988 | ............. | B60T 13/02 |
| EP | 1256703 A2 | 11/2002 | | |
| JP | S59153920 A | 9/1984 | | |
| JP | H10213102 A | 8/1998 | | |
| JP | 2009114928 A * | 5/2009 | | |
| WO | 2004053299 A1 | 6/2004 | | |
| WO | WO 2013061357 A1 * | 5/2013 | ............. | F16H 25/24 |

\* cited by examiner

TURBOCHARGER COMPRISING A REGULATING UNIT

BACKGROUND OF THE INVENTION

Field of the Invention

The invention relates to an exhaust-gas turbocharger which has a regulating unit for regulating the power of the exhaust-gas turbocharger and which has an actuator, wherein the regulating unit can be adjusted by the actuator. The actuator is connected to the regulating unit via a positioning member and a lever.

Exhaust-gas turbochargers serve for improving the efficiency of an internal combustion engine and thus increasing the power thereof. For this purpose, the exhaust-gas turbocharger has a turbine with a turbine wheel and a compressor with a compressor wheel, wherein the two rotors are arranged on a common shaft. The turbine wheel is in this case driven by way of an exhaust-gas mass flow from the internal combustion engine, and in turn drives the compressor wheel. The compressor compresses inducted fresh air and conducts it to the internal combustion engine. The common shaft is mounted in a bearing housing of the turbocharger. Furthermore, the turbine wheel of the turbine is arranged in a turbine housing, and the compressor wheel of the compressor is arranged in a compressor housing.

The higher the engine speed rises, the faster the turbine wheel of the turbine, and with this also the shaft of the exhaust-gas turbocharger on which the compressor wheel of the compressor is also situated, rotate under the action of the driving exhaust-gas flow rate. The faster rotation of the shaft and thus also of the compressor wheel causes an increase in the air delivery rate of the compressor. This leads to an increasing exhaust-gas flow rate from the engine, and thus in turn to the turbine wheel being driven faster. So as not to exceed the respective mechanical and thermal limits of the engine, regulation of the exhaust-gas turbocharger is necessary. Such regulation of an exhaust-gas turbocharger may be performed using a variable turbine geometry or a wastegate duct or bypass duct which is provided in the turbine housing and which can be closed off by means of a closing element referred to as wastegate or bypass valve. Said closing element can be opened when required in order, in a manner dependent on the degree of opening, to conduct a greater or lesser part of the exhaust gas past the turbine directly into the exhaust tailpipe of the vehicle. A further increase of the turbine rotational speed is prevented in this way.

It is known for a regulating unit of said type (closing element of a wastegate duct or a variable turbine geometry) to be adjusted using an electrical or pneumatic actuator.

It is furthermore already known for the coupling of an actuator of said type to the regulating unit to be realized using an actuator-side positioning member, for example a thrust rod or regulating rod, and a closing element-side operation lever.

To ensure precise control of the regulating unit by means of the actuator, it is necessary for manufacturing and assembly tolerances of the individual components and the positions thereof relative to one another to be compensated. It is therefore necessary for every exhaust-gas turbocharger to be precisely calibrated, which necessitates considerable alignment and assembly outlay during the assembly process.

DE 10 2011 007072 A1 has disclosed an exhaust-gas turbocharger which has a wastegate duct which can be closed off by means of a closing element. The actuator that can adjust the closing element is connected to the closing element via a positioning member in the form of a regulating rod and via a pivotable guide element, provided between the positioning member and the closing element, as operation lever. The guide element is connected to a guide lever which is of flat form and which is inserted into a slot of the positioning member.

EP 1256703 B1 has likewise disclosed a exhaust-gas turbocharger which has a wastegate duct, a closing element and an actuator. The closing element can be opened or closed by means of an operation lever, wherein the positioning member, a regulating rod of the actuator, is connected to the operation lever. Said regulating rod comprises an elongate element, and at least one section of said element is flexible enough to bend about a line during use, in order thereby to compensate position deviations.

BRIEF SUMMARY OF THE INVENTION

The present invention is based on the object of developing an exhaust-gas turbocharger having a regulating unit which is adjusted by means of an actuator via an operation lever and a positioning member, wherein manufacturing and assembly tolerances arising in a connection between the operation lever and the positioning member are compensated, wherein the connection is as simple to produce as possible, and wherein extremely good accessibility to said connection for the assembly process is made possible.

Said object is achieved according to the invention by means of an exhaust-gas turbocharger having the features of the main claim. Advantageous refinements of the invention emerge with the features of the subclaims.

The proposed exhaust-gas turbocharger has a regulating unit for controlling the power of an exhaust-gas turbocharger, wherein the regulating unit can be adjusted by means of an actuator and a thrust rod of the actuator is connected to an operation lever of the regulating unit via an adjustment member. According to the invention, the adjustment member has a screw-nut element and an attachment element which engages therewith.

By means of the screw connection between the screw-nut element and attachment element of the adjustment member, it is possible for manufacturing and assembly tolerances relating to the spacing between the actuator and regulation unit to be compensated in a simple manner, and a connection between the thrust rod of the actuator and the operation lever can be adjusted with precise positioning in a simple manner during the assembly process. Furthermore, the use of said adjustment member makes it possible for the thrust rod of the actuator to be fastened to the operation lever from only one side. This advantageously replaces a conventional connecting technique for example by means of two adjustable lock nuts which require accessibility to the lever from both sides, which is difficult to automate. By automation, assembly of the connection between the positioning member and the lever is simplified, and costs can be saved.

In a preferred embodiment, the screw-nut element comprises a head designed for the engagement of a tightening tool, for example a screwdriver, said head preferably being in the form of a hexagonal screw head and is integrally connected to a cylindrical projection piece which has a passage bore. By means of the tightening tool, the screw-nut element and the attachment element can then be connected to one another in a simple manner by being screwed into one another during the assembly process. By virtue of the fact that only the screw-nut element has to be manipulated it is merely necessary, in the assembly process, for access to be provided to the head of the screw-nut element, and for use to be made of one tool.

It is preferably the case that the screw-nut element has an internal thread in the passage bore and has an external thread on the outer circumference of the cylindrical projection piece. In this embodiment, the attachment element then has an internal thread corresponding to the external thread of the projection piece, and the thrust rod of the actuator has, on its outer circumference, an external thread corresponding to the internal thread of the passage bore of the screw-nut element. The thrust rod of the actuator is then arranged in the passage bore of the screw-nut element and engages with the internal thread thereof. The cylindrical projection piece of the screw-nut element engages, in turn, by way of its external thread with the internal thread of the attachment element. During the assembly process, the connection between the thrust rod of the actuator and the operation lever of the regulating unit can be produced by means of the screw-nut element and the attachment element in a single screw-connection process.

In a particularly advantageous embodiment, the internal thread in the passage bore and the external thread on the projection piece of the screw-nut element each have a codirectionally running thread with the same pitch. The assembly of the lever and of the positioning member can then be performed in a simple manner in one screw-connection process by means of the screw-nut element. This embodiment is particularly advantageous if, during the assembly process, when the connection between the screw-nut element and attachment element is established, the preset position of thrust rod and operation lever should be maintained, that is to say should no longer be changed. This is advantageous in particular if the actuator is an electromechanical actuator. It is however likewise possible for a pneumatic actuator to be used. In this case, during the assembly process, the screw-nut element is initially screwed onto the external thread of the thrust rod and the attachment element is connected to the operation lever of the regulating unit. Then, the thrust rod with the screw-nut element and the operation lever with the attachment element are placed in the desired position relative to one another. Subsequently, the screw-nut element is then turned counter to the direction of rotation in which it was screwed onto the thrust rod, wherein the external thread of the projection piece is placed in engagement with the internal thread of the attachment element. Owing to the fact that the threads are codirectional and have the same pitch, the screw-nut element now moves into the internal thread of the attachment element to the same extent and in the same direction relative to the thrust rod and attachment element, and thus produces the connection.

In another embodiment, it may be provided that the internal thread in the passage bore and the external thread on the projection piece of the screw-nut element, and the associated external thread on the thrust rod and the internal thread in the attachment element, also run codirectionally but each have a different pitch. If connection to the operation lever is now realized by means of the adjustment member, as described above, then owing to the different pitches of the threads, the thrust rod and the attachment element together with the operation lever will be displaced relative to one another. This embodiment is advantageous in particular if the actuator is a pneumatic actuator. Specifically, it is then possible for said relative displacement to be compensated by way of an elastic restoring action of a spring which is situated on the actuator. The spring can thus be placed under preload during the assembly of the system.

In a particularly preferred embodiment, the positioning member has an external thread which engages with the internal thread of the screw-nut element. In this embodiment, the lever is equipped with an internal thread or is fixedly connected to a threaded piece which is preferably in the form of a nut. The internal thread or the threaded piece which is connected to the lever engages with an external thread formed on the projection of the screw-nut element. An advantage of this embodiment is that the screw-nut element can be pre-mounted on the positioning member. In the stated embodiment, the components can be assembled in a particularly simple manner.

To prevent any wear in the screw-nut element, it may be advantageous for the screw-nut element to be braced by way of a lock nut after the connection of the positioning member to the lever. A rotation of the screw-nut element during the operation of the turbocharger is prevented in this way. For this purpose, the lock nut may for example be pre-mounted on the positioning member or on the lever depending on whether the internal thread of the screw-nut element is screwed to the positioning member or to the lever.

Exemplary embodiments of the invention will be discussed on the basis of the appended drawings.

Parts of identical function will be denoted by the same reference signs throughout the figures.

DESCRIPTION OF THE INVENTION

In the exemplary embodiments shown here, the regulating unit is composed of a wastegate duct which has a closing element. Regulation of the pressure in the compressor housing may however also be realized by way of a variable turbine geometry. In this case, an adjustment of the turbine geometry is likewise realized by way of operation of an actuator.

Figure 1:
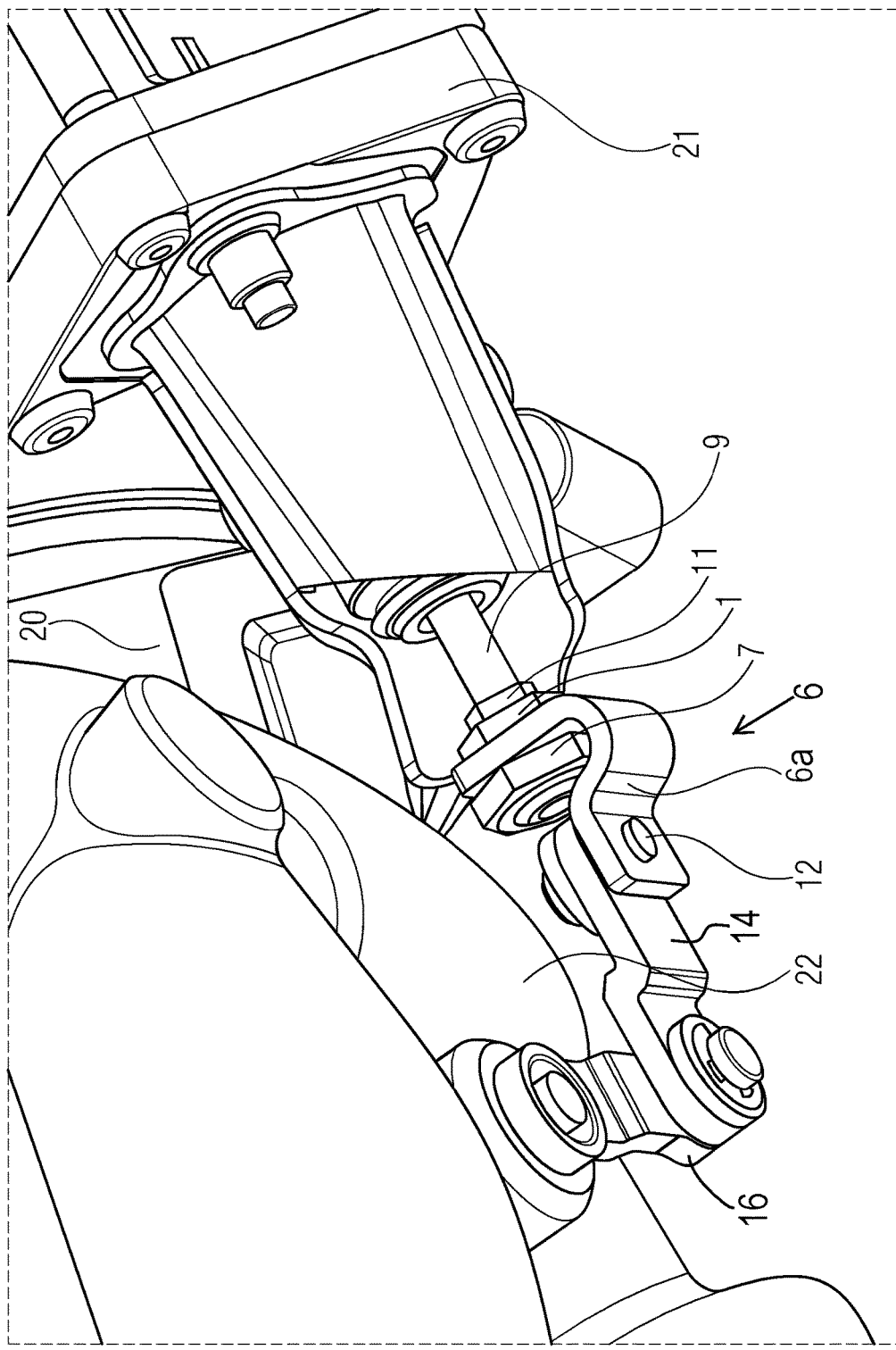
FIG. 1 shows a schematic sketch of a connection of a lever to a positioning member by means of a screw-nut element.

FIG. 1 shows a connection, which is used in the exhaust-gas turbocharger 20 according to the invention, between a positioning member 9 and an operation lever 16 by way of a screw-nut element 1. The positioning member 9 is fixedly connected to an actuator 21 which is fastened to the compressor housing of the exhaust-gas turbocharger, whereas the operation lever 16 is connected by way of an articulated connection to a bypass valve, which serves as closing element, of a wastegate duct situated in the turbine housing 22. The articulated connection is formed by at least one lever 14 which is articulatedly connected to a projection 12 arranged on an attachment element 6. The actuator 21 can, via the stated connection, open or close the bypass valve to a greater or lesser extent in a manner dependent on the pressure in the compressor housing, in order to thus regulate the turbine power. To compensate manufacturing and assembly tolerances that arise in a coupling between the bypass valve and the actuator 21, the connection between the positioning member 9 and the operation lever 16 is formed by way of the screw-nut element 1.

Figure 2:
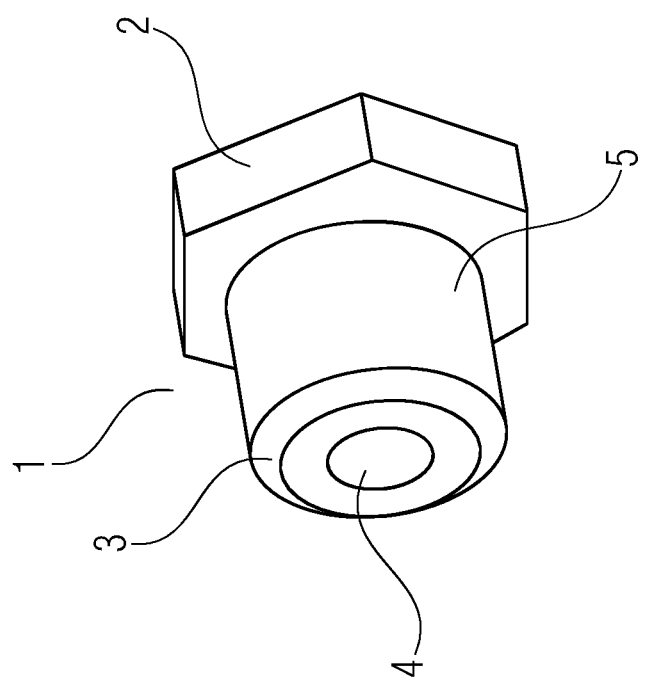
FIG. 2 shows a schematic sketch of the screw-nut element.

FIG. 2 shows a schematic sketch of the screw-nut element 1 which has a hexagonal head 2 which is designed for the engagement of a tightening tool and which is integrally connected to a cylindrical projection 3 which has a bore. The bore is equipped with an internal thread 4, and an external thread 5 is formed on the cylindrical outer circumference of the projection 3. The bore which has the internal thread 4 extends through the screw head 2. In order to realize the simplest possible assembly process, the screw-nut element 1 can be pre-mounted on the positioning member 9.

Figure 3:
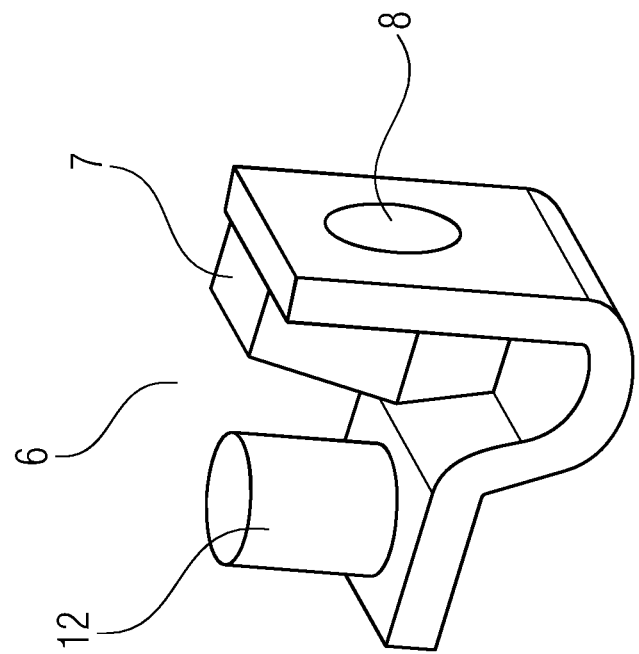
FIG. 3 shows a schematic sketch of the lever.

FIG. 3 is a schematic sketch of the attachment element 6. A structural element 6a of the attachment element 6 is composed of a straight part which is integrally connected via a curved region to an angled part. The angled part of the attachment element 6 is welded to a threaded piece 7 which has a hexagonal head and which has an internal thread 8. A contour of the internal thread 8 is fitted congruently onto an opening of the angled part. In this way, the screw-nut element 1 can be screwed to the threaded piece 7 through the opening. Instead of the welded-on threaded piece 7, provision may however also be made of a thread which is formed integrally on the attachment element 6 and which is screwed to the screw-nut element 1. The projection 12 which is fastened by way of the articulated connection to the bypass valve is formed integrally on the straight part of the attachment element 6.

Figure 4:
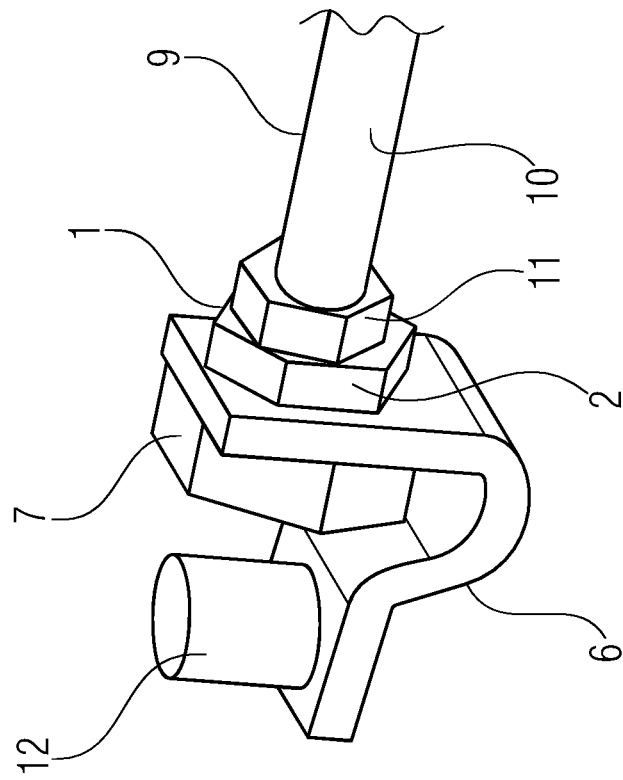
FIG. 4 shows a schematic sketch of the connection of the lever to the positioning member.

FIG. 4 shows the fastening of the positioning member 9 to the attachment element 6 by way of the screw-nut element 1. In the exemplary embodiment, the positioning member 9 has an external thread 10 which engages with the internal thread 4 of the screw-nut element 1. The external thread 5 of the screw-nut element 1 is screwed to the internal thread 8 of the threaded piece 7. The internal thread 4 and the external thread 5 of the screw-nut element 1 have in this case the same pitch, whereby assembly of the attachment element 6 with the positioning member 9 can be realized in an extremely simple manner by way of the screw-nut element 1. During the assembly of the exhaust-gas turbocharger, for the connection of the positioning member 9 to the attachment element 6, the bypass valve is placed into a closed position, and the actuator which is connected to the positioning member 9 is likewise moved into an end position which corresponds to the closed position of the bypass valve. The positioning member 9 and the attachment element 6 remain stationary in their resulting positions while the screw-nut element 1, which has been pre-mounted on the positioning member 9, is turned on the external thread 10 of the positioning member 9 by way of an external tool and is thus moved in the direction of the attachment element 6. The screw-nut element thus moves toward the threaded piece 7 of the attachment element 6 and is, by way of its external thread 5, placed in engagement with the internal thread 8 of the threaded piece 7. Tolerance compensation in the longitudinal direction of the positioning member 9 is realized in the sense that, here, the positioning member 9 projects to a greater or lesser extent through the threaded piece 7 and the screw-nut element 1. The connection is thus variably adjustable.

In the exemplary embodiment, the stated actuator is an electric actuator. An electric actuator of said type offers a higher positioning speed, greater positioning accuracy and higher positioning forces than a pneumatic actuator. If a pneumatic actuator is provided, use may also be made of different pitches for the internal thread 4 and the external thread 5. Owing to the different pitches of the threads, the connection between the attachment element 6 and the positioning member 9 is displaced during the assembly process. This different position can be compensated by way of a restoring action of a spring situated on the actuator, and thus the spring of the actuator is placed under preload during the assembly process. The latter is not possible in the case of the electric actuator. Therefore, if the electric actuator is used, it is important that the internal thread 4 and the external thread 5 have the same pitch.

Figure 5:
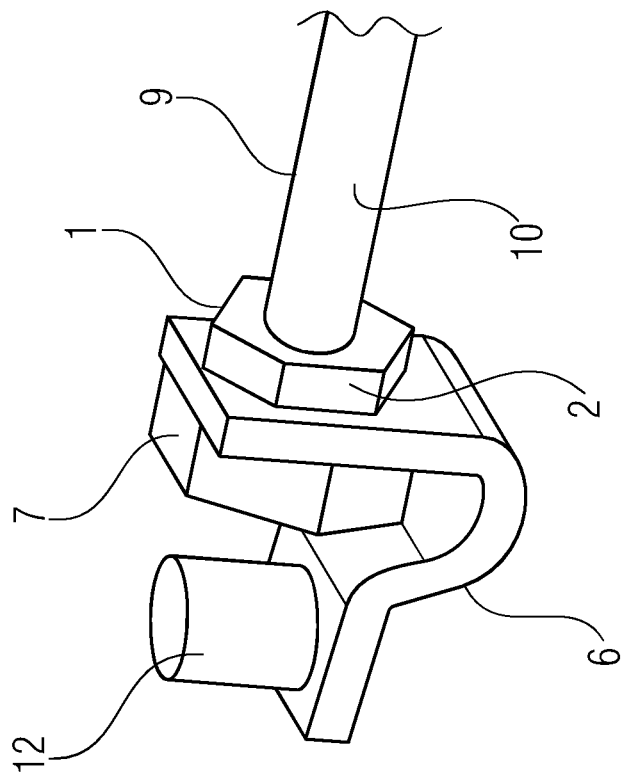
FIG. 5 shows a schematic sketch of the connection as in FIG. 4 with an additional lock nut for bracing the screw-nut element.

In FIG. 5, the screw-nut element 1 is, in addition to the embodiment in FIG. 4, braced on the external thread 10 of the positioning member 9 by way of a lock nut 11 which has an external hexagon. When the tolerance compensation described on the basis of FIG. 1 has been performed, the screw-nut element 1 is braced by way of the lock nut 11. The lock nut 11 prevents a rotation of the screw-nut element 1 on the positioning member 9 during operation, thus preventing wear of the screw-nut element 1. For optimum assembly, the lock nut 11 is pre-mounted on the positioning member 9 before the bracing with the screw-nut element 1.

The invention claimed is:

1. An exhaust-gas turbocharger assembly, comprising:
   an exhaust-gas turbocharger;
   a regulating unit for regulating a power of said exhaust-gas turbocharger, said regulating unit having an operation lever assigned thereto and mounted for pivoting about a first articulated connection;
   an actuator for operating said regulating unit, said actuator having a thrust rod for operating said regulating unit via said operation lever, said thrust rod being formed with an external thread;
   an adjustment member connecting said thrust rod with said operation lever, said adjustment member having an attachment element, being formed with an internal thread and being coupled to said operation lever by way of a second articulated connection, and a screw-nut element;
   said screw-nut element having a first threaded region coupling said screw-nut element to said attachment element, and a second threaded region coupling said screw-nut element to said thrust rod; and
   said first threaded region being an external thread formed on a projection piece of said screw-nut element meshing with the internal thread of said attachment element and said second threaded region being an internal thread formed in a passage bore of said screw-nut element meshing with the external thread of said thrust rod.

2. The exhaust-gas turbocharger assembly according to claim 1, wherein said screw-nut element is formed with an operation region configured for the engagement of a tightening tool.

3. The exhaust-gas turbocharger assembly according to claim 1, wherein said each of said internal thread in the passage bore and said external thread on the projection piece of the screw-nut element has a codirectionally running thread formed with the same pitch or with different pitch.

4. The exhaust-gas turbocharger assembly according to claim 1, wherein said actuator is an electromechanical actuator and wherein a pitch of said internal thread of said screw-nut element equals a pitch of said external thread of said screw-nut element.

5. The exhaust-gas turbocharger assembly according to claim 3, wherein said actuator is a pneumatic actuator, and wherein a pitch of said internal thread of said screw-nut element is different from a pitch of said external thread of said screw-nut element.

6. The exhaust-gas turbocharger assembly according to claim 1, which comprises a lock nut bracing said screw-nut element.

7. The exhaust-gas turbocharger assembly according to claim 1, wherein said attachment element is fixedly connected to a threaded piece disposed to mesh with said external thread formed on said projection piece of said screw-nut element.

8. The exhaust-gas turbocharger assembly according to claim 7, wherein said threaded piece is a nut.

9. The exhaust-gas turbocharger assembly according to claim 1, wherein said screw-nut element is braced by a locking nut, said locking nut being connected to said thrust rod.

* * * * *